United States Patent
Geelen et al.

(10) Patent No.: US 9,429,429 B2
(45) Date of Patent: Aug. 30, 2016

(54) NAVIGATION DEVICE AND METHOD

(75) Inventors: Pieter Geelen, Amsterdam (NL); Jacob Eisenberg, Salenstein-Mannebach (CH)

(73) Assignee: TomTom International B.V., Amsterdam (NL)

( * ) Notice: Subject to any disclaimer, the term of this patent is extended or adjusted under 35 U.S.C. 154(b) by 286 days.

(21) Appl. No.: 13/704,707

(22) PCT Filed: Jun. 17, 2010

(86) PCT No.: PCT/EP2010/058570
§ 371 (c)(1),
(2), (4) Date: Mar. 8, 2013

(87) PCT Pub. No.: WO2011/157296
PCT Pub. Date: Dec. 22, 2011

(65) Prior Publication Data
US 2013/0211705 A1    Aug. 15, 2013

(51) Int. Cl.
G01C 21/00    (2006.01)
G01C 21/34    (2006.01)
G01C 21/36    (2006.01)

(52) U.S. Cl.
CPC .............. *G01C 21/00* (2013.01); *G01C 21/34* (2013.01); *G01C 21/3685* (2013.01)

(58) Field of Classification Search
CPC .......... G01C 21/3679; G01C 21/3685; G01C 21/3453
USPC ....... 701/123, 418, 420, 424, 411, 410, 423; 340/932.2
See application file for complete search history.

(56) References Cited

U.S. PATENT DOCUMENTS

| 6,411,895 | B1 | 6/2002 | Lau et al. | |
|---|---|---|---|---|
| 7,948,399 | B2 | 5/2011 | Tomita et al. | |
| 2004/0167712 | A1* | 8/2004 | Plutowski | 701/209 |
| 2007/0299599 | A1* | 12/2007 | Letchner et al. | 701/200 |
| 2008/0048885 | A1 | 2/2008 | Quinn | |
| 2009/0171563 | A1 | 7/2009 | Morimoto et al. | |
| 2009/0171566 | A1 | 7/2009 | Morimoto et al. | |

FOREIGN PATENT DOCUMENTS

| CN | 101373140 A | 2/2009 |
|---|---|---|
| JP | 2004177199 A | 6/2004 |
| JP | 2004240805 A | 8/2004 |
| JP | 2009162567 A | 7/2009 |
| JP | 2009162569 A | 7/2009 |
| JP | 2009193293 A | 8/2009 |
| WO | 2009156186 A2 | 12/2009 |

OTHER PUBLICATIONS

International search Report issued Feb. 24, 2011 for International Application No. PCT/EP2010/058570.

* cited by examiner

*Primary Examiner* — Jelani Smith

(57) ABSTRACT

Embodiments of the present invention relate to a route-planning device (200;302) comprising a storage section (230;308) storing map information, the map information including information identifying a plurality of potential positions, each potential position corresponding to a position at which a location of a predetermined type might potentially be found; and a search route module (490) arranged to determine a search route visiting at least one of the potential positions, the determination of the search route using a predetermined efficiency measure based on likelihood of finding a location of the predetermined type.

17 Claims, 9 Drawing Sheets

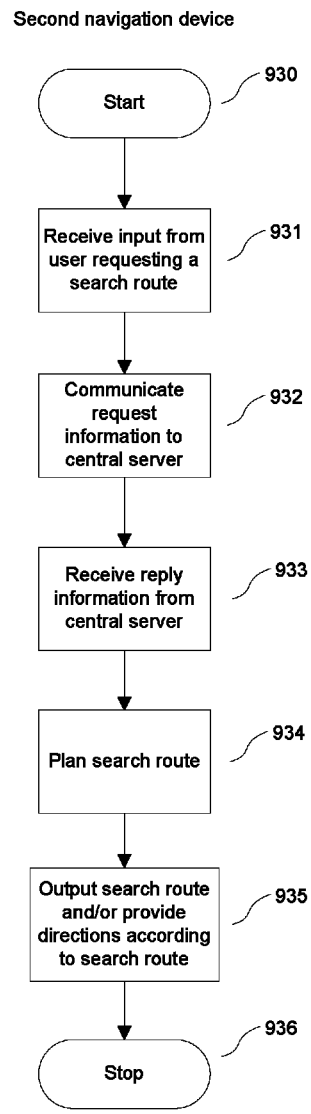

NAVIGATION DEVICE AND METHOD

CROSS-REFERENCES TO RELATED APPLICATIONS

This application is the National Stage of International Application No. PCT/EP2010/058570, filed Jun. 17, 2010 and designating the United States. The entire content of this application is incorporated herein by reference.

FIELD OF THE INVENTION

This invention relates to navigation devices and to methods for planning routes. Illustrative embodiments of the invention relate to portable navigation devices (so-called PNDs), in particular PNDs that include Global Positioning System (GPS) signal reception and processing functionality. Other embodiments relate more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the users PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 7201 model manufactured and supplied by TomTom International B.V., provide a reliable means for enabling users to navigate from one position to another.

In order for a navigation device to calculate a route, it must be provided with a destination, such as an address or map reference, having a specific location that can be uniquely identified by the navigation device. This is of limited assistance to a user that is primarily interested in reaching a specific type or class of destination, and is less concerned, or unconcerned, with the specific position of the destination. Further, a given destination may, in theory, appear to meet a user's needs, but when the user arrives be revealed to be unsatisfactory. Navigation devices do not have the capacity to take these situations into account when calculating routes. Embodiments of the present invention have the aim of addressing this shortcoming.

SUMMARY OF THE INVENTION

In pursuit of this aim, a presently preferred embodiment of the present invention provides: a route-planning device comprising a storage section storing map information, the map information including information identifying a plurality of potential positions, each potential position corresponding to a position at which a location of a predetermined type might potentially be found; and a search route module arranged to determine a search route visiting at least one of the potential positions, the determination of the search route using a predetermined efficiency measure based on likelihood of finding a location of the predetermined type.

This allows the determination of a search route that is likely to find a location of the desired type in an efficient manner.

In an embodiment, the map information includes probability information for each potential position, the probability information corresponding to the likelihood of finding a location of the predetermined type at the respective potential position.

This allows the efficiency to be improved by taking into account the probability that a potential position actually matches the user's requirements.

The probability information may include a temporal component indicative of temporal variations in the likelihood of finding a location of the predetermined type at the respective potential position.

This allows the probability information to reflect temporal changes in the actual (real-world) probability of finding a location of the target type.

The potential positions may correspond to parking spaces, and the locations of a predetermined type may correspond to vacant parking spaces.

Accordingly, the user may be provided with directions to perform an efficient search for a vacant parking space.

The search route may be determined so as to visit a plurality of the potential positions.

It is preferable that the search route visits a plurality of potential positions in order to increase the likelihood of finding a location of the desired type.

The route-planning device may include an input section for receiving commands from a user, wherein when a user indicates, via the input section, that a search route for a location of a predetermined type should be determined, the search route module is arranged to set a current position of the device to be a start position, and the search route module is arranged to determine the search route so as to start from the start position.

The predetermined efficiency measure may be based, at least in part, on a predetermined metric relating the start position and the potential positions.

The search route module may include a goal identification section for identifying a goal position, and the predetermined efficiency measure may be based on a predetermined metric relating the goal position and the potential positions.

The search route module may further comprise a result determining module arranged to determine whether or not a location of the predetermined type was found at a visited potential position.

This allows information on the result of the search to be used, for example to improve subsequent determination of search routes.

The route-planning device may include a positioning information determination section for determining current positioning information including at least a current position of the device, wherein the result determining module is arranged to: determine, based on the positioning information, whether a potential position has been reached, determine whether a vehicle in which the device is provided has parked, indicate that a location of the predetermined type was found at the potential position if it is determined that the potential position has been reached and it is determined that the vehicle has parked, and indicate that a location of the predetermined type was not found if it is determined that the potential position has been reached and it is determined that the vehicle has not parked.

This allows automatic determination of the result for potential positions that have been visited.

The route-planning device may be arranged to determine, after indicating that a location of the predetermined type was found at a particular potential position, whether or not the vehicle has left the particular potential position, and when it is determined that the vehicle has left the particular potential position perform at least one of: communicate to a server that the particular potential position has been left, communicate to another route-planning device that the particular potential position has been left, and/or set or update temporary probability information, to be used temporarily in place of the probability information.

This allows the information that the vehicle has left the particular potential position to be used e.g to improve search routes of other route-planning devices.

The route-planning device may further comprise an updating section, wherein the device is arranged to perform at least one of: communicate the determination of the result determining module to a server, communicate the determination of the result determining module to another route-planning device, update the probability information based on the determination of the result determining module, and/or set or update temporary probability information, to be used temporarily in place of the probability information, based on the determination of the result determining module.

This allows the use of information that has short-term reliability, but that is subject to change (e.g. there are currently no parking spaces at a particular location).

An embodiment includes a server comprising: the route-planning device; a receiving section for receiving, over a network, a request for a search route from a remote device; a sending section for sending, over the network, the search route determined by the device.

This embodiment provides a server for providing a search route to a remote device.

The server may include an updating section, wherein the receiving section is arranged to receive result information from the remote device, and the updating section is arranged to adjust the map information based on the result information.

This allows the server to refine the map information based on result information from the remote device. Preferably, the map information includes probability information, and the probability information is updated based on the result information.

According to an aspect of the invention, a computer-implemented method provides a search route, the method comprising: receiving a request to provide a search route for a location of a predetermined type; identifying, from map information, a plurality of potential positions, each potential position corresponding to a position at which a location of the predetermined type might potentially be found; determining a route visiting at least one of the potential positions, the determination of the route using a predetermined efficiency measure based on likelihood of finding a location of the predetermined type; and outputting the determined route as the search route.

This method allows a user to be provided with a search route that is likely to find a location of the desired type in an efficient manner.

Yet another embodiment of the present invention relates to computer software comprising one or more software modules operable, when executed in an execution environment, to cause a processor to perform as the modules and sections of the above embodiments, or to carry out the method of the above embodiments.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 9c is a flowchart illustrating a method performed by an embodiment of the invention;

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

References herein to sections or modules are not intended to be particularly limiting, and the functionality attributed to such a module or section could be provided by a plurality of components. Similarly, an individual component may provide, or contribute to, the functionality of a number of sections and/or modules. The various sections and modules may be implemented in hardware, software or a combination of the two.

References to data or information being stored include storage by mass storage devices (such as optical discs and magnetic discs) or active memory (such as RAM).

References to data or information "stored at", or "at" is used as a shorthand for "accessible to", and does not imply a physical location of the storage, unless the context demands otherwise.

For clarity of explanation, some embodiments of the invention are described using the example of a parking space as the target location type. The invention is not limited to this, as would be clear to the man skilled in the art. The embodiments could be modified as appropriate to allow the invention to be applied to other target location types, without undue experimentation by the skilled man.

In the following description, various embodiments of the invention are described. It would be clear to the skilled man that the features of these embodiments could be combined in various ways without undue experimentation.

Figure 1:
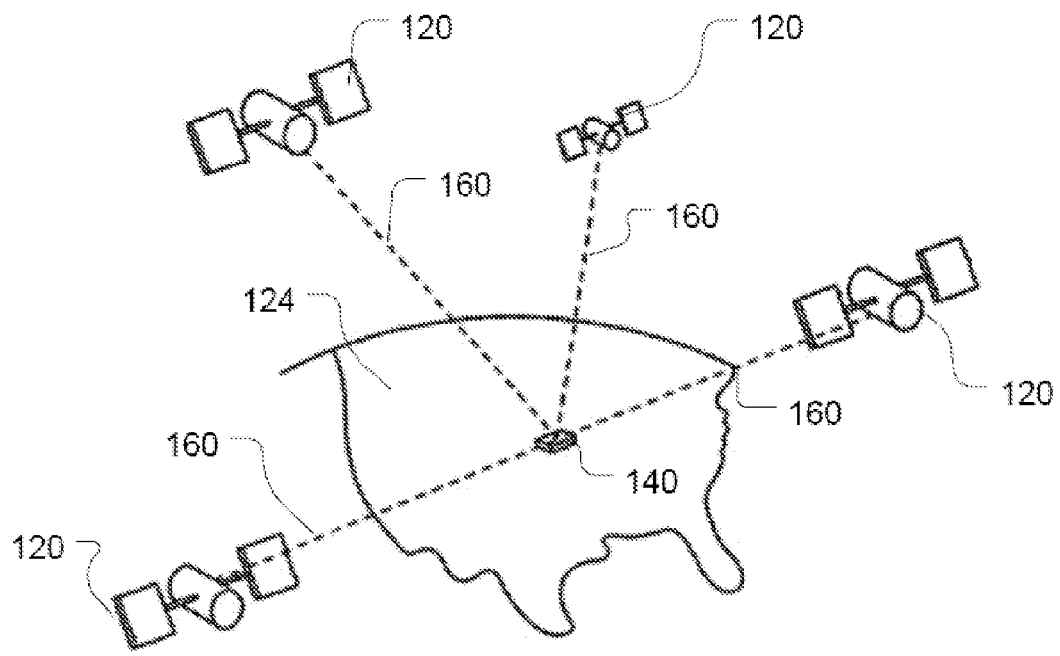
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the OPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
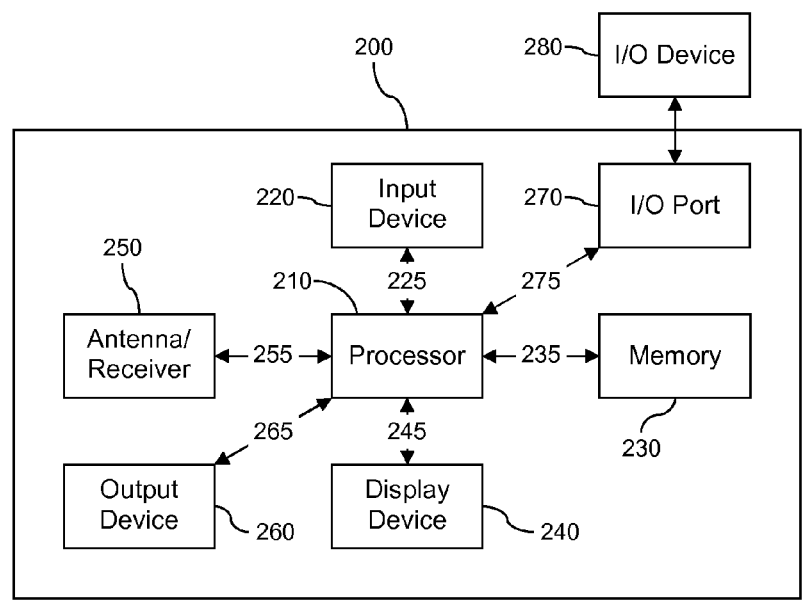
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
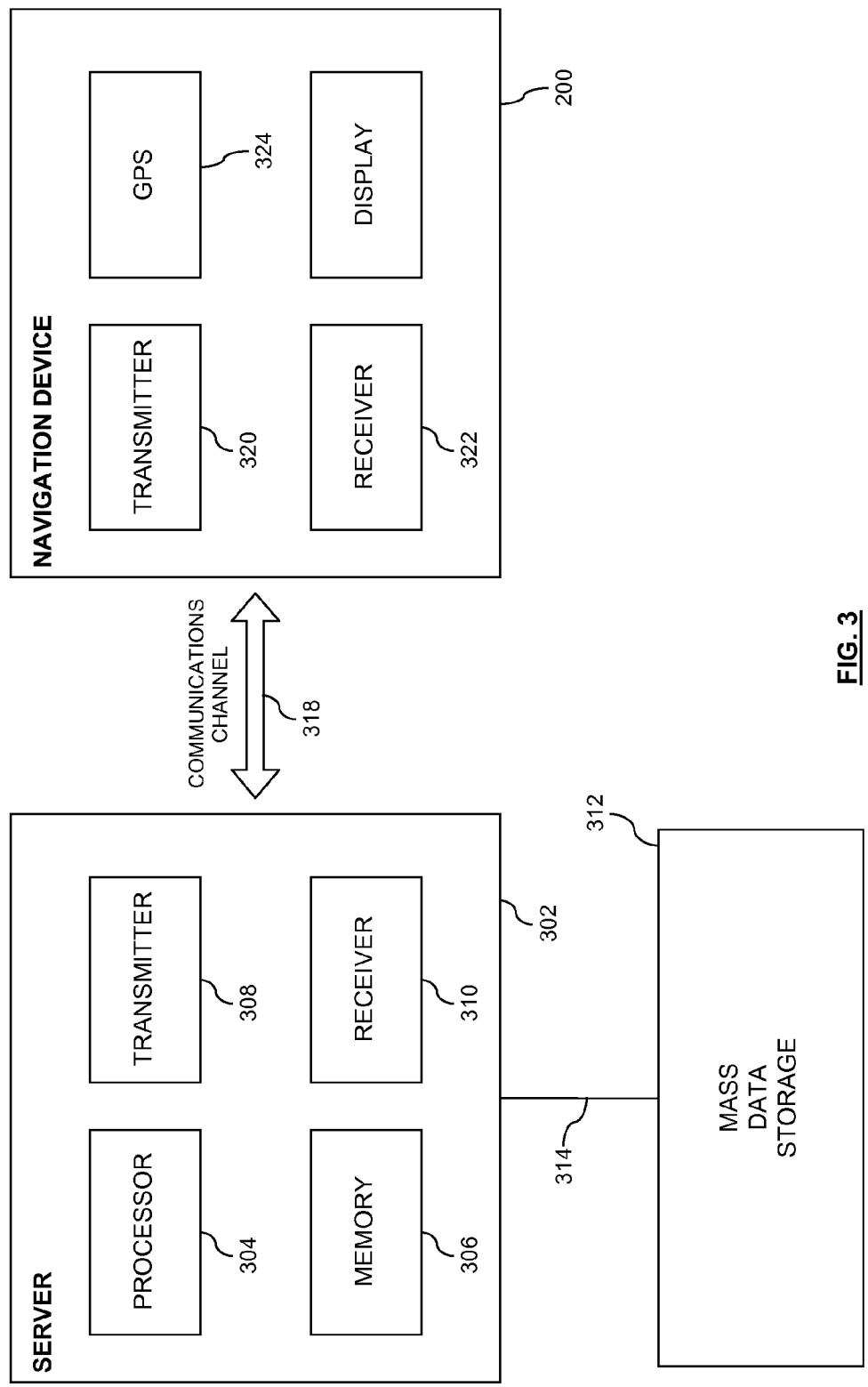
FIG. 3 is a schematic illustration of the manner in which a navigation device may receive information over a wireless communication channel.

Referring no to FIG. 3, the navigation device 200 may establish mobile or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the Internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as COMA, GSM, WAN, etc.

As such, an Internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (COMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an interact connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
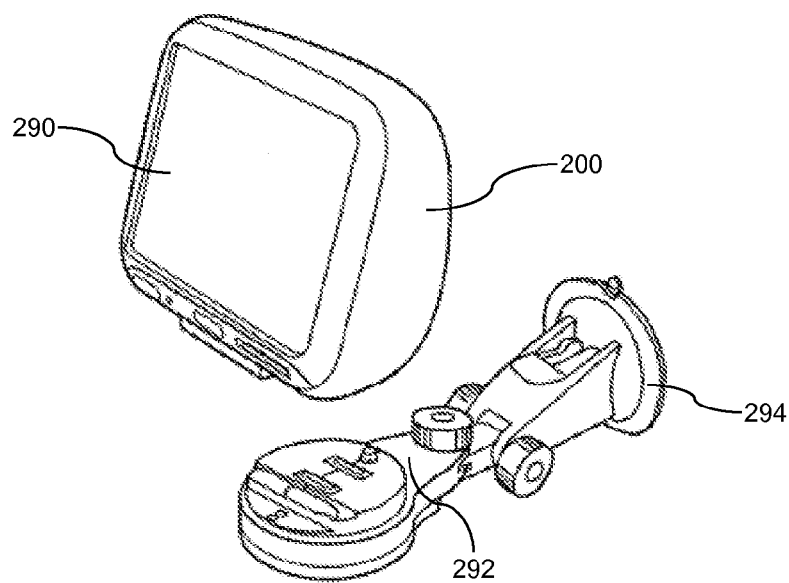
FIGS. 4A and 4B are illustrative perspective views of a navigation device.
Figure 4B:
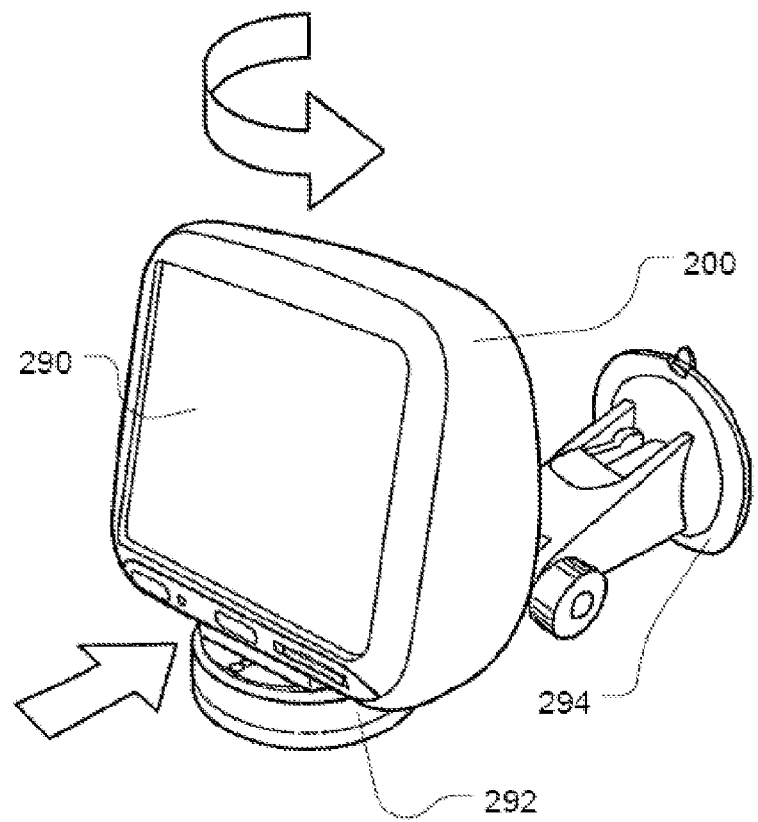

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 48, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 48. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
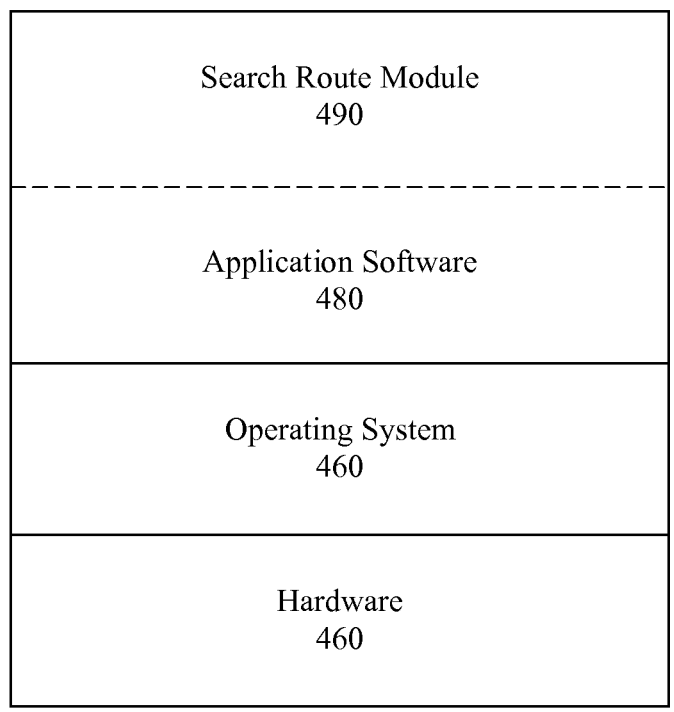
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith. In accordance with the preferred embodiment of the present invention, part of this functionality comprises a search route module 490, the function of which will now be described in detail in connection with the following figures.

According to an embodiment of the invention, the navigation device stores (or has access to) information relating to a plurality of locations, including at least position information sufficient to allow the device to plan routes to or from those locations. At least some of the locations are identified as falling within a specific type of location which may meet a user's requirements (i.e. locations of a target location type), but cannot be guaranteed to do so. These locations can be thought of as potential locations (at potential positions), as they potentially satisfy the users requirements. For example, the target location type may be "parking spaces" when the user requires "a vacant parking space". The navigation device of the present embodiment would provide the user with a search route that will visit one or more of the parking spaces (locations of the specific type) until a vacant parking space is found. Ideally the search route should have a high likelihood of finding a parking space, while possibly taking into account other factors, such as the distance to the parking space, any fee for parking at the space, and the actual position of the space relative to other locations.

Other types of location are equally applicable, as would be clear to the skilled person. For example, the user may require a hotel, but wish to see the hotel in person before deciding whether it is satisfactory. The user would then require a search route visiting one or more hotels for consideration. The example of a hotel would be applicable to a navigation device for use by a pedestrian or to a device for mounting in a vehicle. On the other hand, the example of finding a vacant parking space is most likely to be useful when the navigation device is mounted in a vehicle. For convenience, the example of parking spaces will be used to describe the present embodiment, but should not be considered limiting.

In response to a user request for a vacant parking space, the search route module searches map information stored in memory 230, and determines a plurality of locations that might be of the type requested by the user (locations of the target location type). The search route module then determines a route using a predetermined efficiency measure based on a likelihood of finding a location of the requested type. The user is then informed of the route via the output device 260 and/or the display device 240, or the route may be output via the I/O device.

In one embodiment the navigation device 200 includes a positioning information determining section, such as GPS unit 324 shown in FIG. 3, which provides at least information on the current position of the device 200, and may also provide information on a direction and/or velocity of movement of the device 200. The positioning information determining section can be implemented using GPS, for example. When the user indicates that a vacant parking space is required, the search route module 490 determines a route starting from the present location (current position of the device 200) with a likelihood of finding a vacant space, with the least distance traveled, as high as possible, e.g. by designing the search route to pass as many parking spaces as possible with the least distance traveled.

This provides the user with a search route that gives a good chance of finding a parking space in a short time/travel distance. This is preferable to directing the user to a series of car parks in an arbitrary manner, taking each successive car park in isolation. For example, if the closest car park is small, and at a slightly greater distance in the opposite direction are a number of closely grouped, large car parks, the large car parks may provide a better chance of finding a vacant parking space with the least distance traveled.

Figure 6:
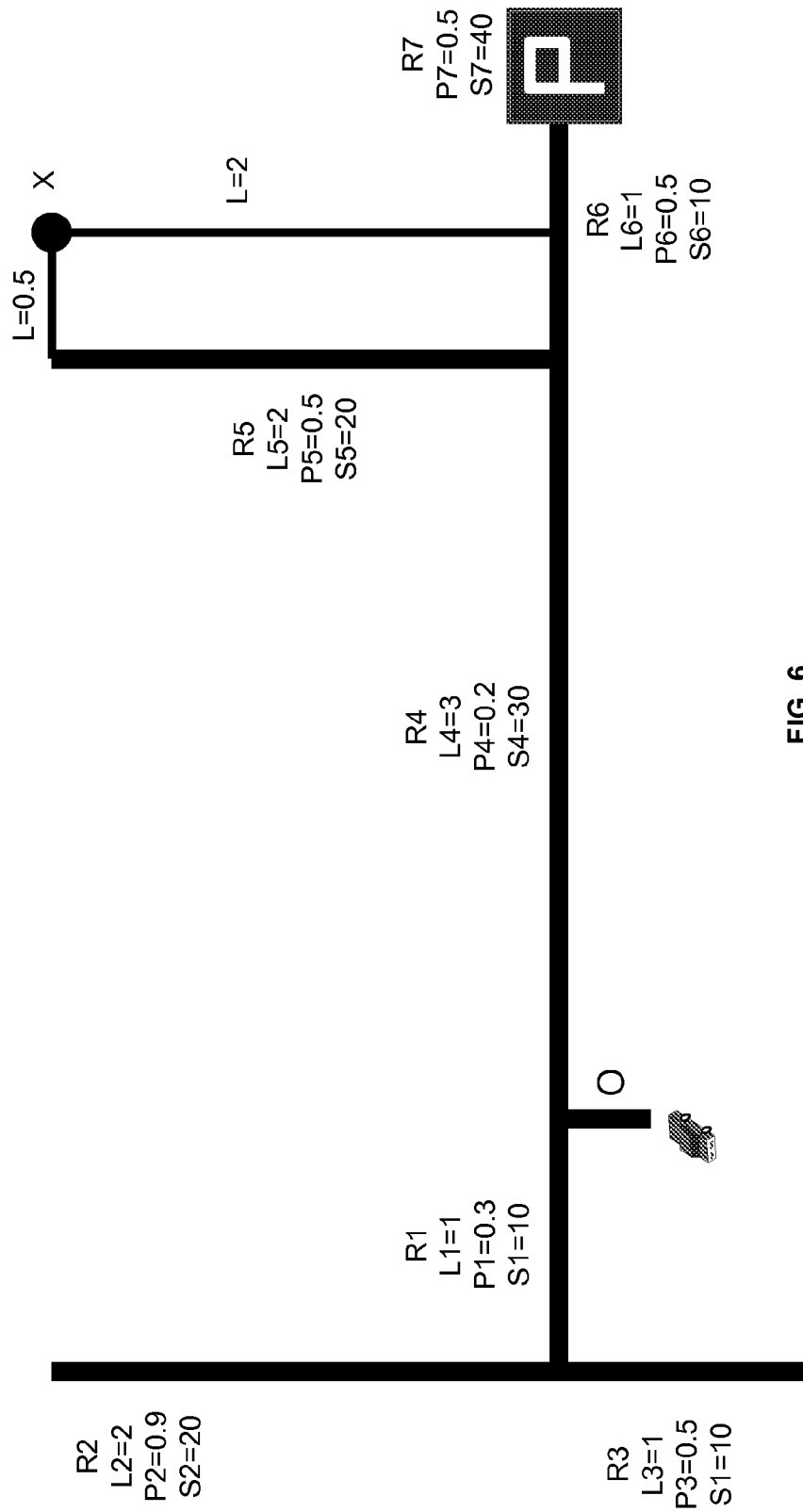
FIG. 6 is a schematic diagram of a road network for illustrating embodiments of the invention.

By way of example, FIG. 6 shows a simplified schematic road network of roads R1 to R6. Each road has a length, L1 to L6, in arbitrary units, and it is assumed that parking is possible on each of the roads. The number of parking spaces on each road, Si, may, be included in the map information, or can be estimated based on the length of the road and any information on the type of road, (e.g. number of lanes, known parking restrictions, etc). In the present example, it is assumed that the number of spaces on each road Ri is 10×Li, as longer roads are likely to have more space in which to park (all other things being equal). A car park R7 is located at the end of road R6, and in this example has 40 parking spaces. For simplicity R7 may be referred to herein as a "road". Assume that the user and navigation device are approaching junction O, and the user has instructed the navigation device 200 to plan a search route for a parking space. According to this example, roads R1 to R6 may be all roads that permit parking within a predetermined cutoff radius. Alternatively they may be all of the roads with parking that can be reached within a predetermined travel distance. The cutoff radius or travel distance could be determined from the position at which the user requests the search route or junction O.

The search route module 490 evaluates a cost function for each route available from the next junction; in this case, turning left or turning right. Herein junction is used to describe any location where possible routes diverge, or where there is a choice between two or more routes. The next junction is the first junction that will be arrived at when starting from a particular location and travelling in a particular direction. Oi for a particular junction represents the set of roads that can be reached by making a particular route choice (labelled i) at that junction. Oi is typically dependent on position and location. In the present example, O1={R1, R2, R3} represents the set of roads that can be reached by turning left, and O2={R4, R5, R6, R7} represents the set of roads that can be reached by turning right. A first example of the cost function is $$C1(Oj) = \sum_{Ri \in Oj} \frac{Si}{Di},$$

where Di is the distance between road Ri and junction O. In this example, this is taken to be the distance from O to the mid-point of the road, as this is assumed to be representative of the average location of a parking space on that road, although this could be modified by additional information, such as a weighting towards one end of the road. It is also possible to divide roads into sub-roads to account for different conditions at each sub-road. The evaluation of the cost function for this example is shown in tablet.

TABLE 1

| Road | Length | Spaces | Di (Left) | Di (Right) | Cost function C1 | |
|------|--------|--------|-----------|------------|------------------|---|
|      |        |        |           |            | Si/Di (Left) | Si/Di (Right) |
| R1 | 1 | 10 | 0.5 | x | 20 | 0 |
| R2 | 2 | 20 | 2 | x | 10 | 0 |
| R3 | 1 | 10 | 1.5 | x | 6.67 | 0 |
| R4 | 3 | 30 | x | 1.5 | 0 | 20 |
| R5 | 2 | 20 | x | 4 | 0 | 5 |
| R6 | 1 | 10 | x | 3.5 | 0 | 2.86 |
| P | 0 | 40 | x | 4 | 0 | 10 |
| Total |  |  |  |  | 36.67 | 37.86 |

As can be seen from table 1, the cost function (last row) for turning right is higher than the cost function for turning left, and so the search route is a turn to the right. Note that here "cost function" is used in its mathematical sense to mean a function that is maximised or minimised in the optimal condition. Here a maximised cost function is the preferred solution, but other cost functions could be constructed that give the preferred result when minimised. In accordance with the calculated search route, the navigation device 200 gives directions to the user (via the display device 240, loudspeaker 260 or I/O port 270) to turn right.

According to a second example of the cost function, the map information includes probability information relating to the probability of finding a parking space at a particular road. FIG. 6 gives example probability information Pi for each Ri; in this case it is assumed that the probability is an overall probability for finding a space on that road, and 0≤Pi≤1. An example cost function using Pi is $$C2(Oj) = \sum_{Ri \in Oj} \frac{Pi}{Di}.$$

Table 2 shows the result of using this cost function in this example.

TABLE 2

| Road | Length | Di (Left) | Di (Right) | Pi | Cost function C2 | |
|------|--------|-----------|------------|----|------------------|---|
|      |        |           |            |    | Pi/Di (Left) | Pi/Di (Right) |
| R1 | 1 | 0.5 | x | 0.3 | 0.6 | 0 |
| R2 | 2 | 2 | x | 0.9 | 0.45 | 0 |
| R3 | 1 | 1.5 | x | 0.5 | 0.33 | 0 |
| R4 | 3 | x | 1.5 | 0.2 | 0 | 0.13 |
| R5 | 2 | x | 4 | 0.5 | 0 | 0.125 |
| R6 | 1 | x | 3.5 | 0.5 | 0 | 0.14 |
| P | 0 | x | 4 | 0.5 | 0 | 0.125 |
| Total |  |  |  |  | 1.38 | 0.53 |

According to this example, the navigation device would direct the user to turn left at junction O, as the cost function for turning left is greater than for turning right. This differs from the direction given according to cost function C1 because in this example there is a poor correlation between the (estimated) number of spaces and the probability of finding a vacant space. As such, this example provides an improved search route when probability information is available.

The probability values Pi can be estimated from knowledge of the type of road and road rules, such as the number of lanes, whether it is a one-way or two-way road, etc. Alternatively the probability values can be determined empirically, e.g. by conducting a survey.

A third example of the cost function takes into account a final destination, or goal, that the user intends to travel to after finding a parking space. According to embodiments of the invention for use with this example cost function, the device is arranged to receive from the user, e.g. via touch screen 220, information that a vacant parking space is required, and that after finding a vacant parking space, the user intends to travel to a further location, X, leaving the vehicle at the parking space. In FIG. 6, X represents a goal that can be reached on foot from R5 or R6, and Xi represent distances from the centre point of Ri (average location of the parking space on Ri) to X. In this case, the cost function may be $$C3(Oj) = \sum_{Ri \in Oj} \frac{Pi}{Di + \alpha Xi},$$

where α is a predetermined constant to weight the relative importance of the distances Di and Xi. For example, when the user will walk from the parking space to X, it may be acceptable to drive for longer to find a parking space close to X; in this case a might be set to 10. The result of using this cost function on the example in FIG. 6 is shown in table 3, for simplicity this example uses α=1.

TABLE 3

| Road | Length | Xi | Di (Left) | Di (Right) | Pi | Cost function C3 | |
|------|--------|----|-----------|------------|----|------------------|---|
|      |        |    |           |            |    | Left | Right |
| R1 | 1 | 6 | 0.5 | x | 0.3 | 0.05 | 0 |
| R2 | 2 | 7.5 | 2 | x | 0.9 | 0.09 | 0 |
| R3 | 1 | 7 | 1.5 | x | 0.5 | 0.06 | 0 |
| R4 | 3 | 4 | x | 1.5 | 0.2 | 0 | 0.04 |
| R5 | 2 | 1.5 | x | 4 | 0.5 | 0 | 0.09 |
| R6 | 1 | 2 | x | 3.5 | 0.5 | 0 | 0.09 |
| R7 | 0 | 2.5 | x | 4 | 0.5 | 0 | 0.08 |
| Total |  |  |  |  |  | 0.19971422 | 0.295105 |

The probabilities in this example are the same as those in the second example of the cost function, but the navigation device in this example would direct a user to turn right (right gives a higher value of C3), as the proximity to X outweighs the reduced probability of finding a parking space. This allows the search route to take into account the location of the potential position relative to the position(s) of other location(s), as well as the chance of finding a location of a target type.

Another example cost function is $$C4(Oj) = \sum_{Ri \in Oj} \frac{Pi}{Di + \alpha Xi^2}.$$

C4 is similar to C3 but the weighing between Di and Xi becomes more significant with increasing Xi. This might correspond to the cost function tolerating a short walk from the parking space to the goal, but avoiding long walks.

The cost function could be weighted depending on a fee for parking at a particular location, e.g.

$$C5(Oj) = \sum_{Ri \in Oj} \frac{Pi}{Di + \alpha Xi + \beta Fi},$$

where Fi is a fee or charge for parking on road Ri.

In another example, a local search route (local to goal, X) is calculated in a similar manner to those above, but taking the final goal X (or a road nearby) as the starting point of the search, and using cost function $$C6(Nj) = \sum_{Ri \in Nj} \frac{Pi}{Xi},$$

where the Nj are sets of roads, similar to Oj, above, but based on the first junction that is reached when driving away from the starting point near X. The search route is then determined by planning a route from the current location to the start point of the local search route, or some other point on the local search route. This will provide a local search route that has a good likelihood of finding a vacant parking space close to the goal, X, but does not give any weighting to the distance between the starting point of the search route and the parking space. Where different directions can be taken from the starting point of the local search route, search routes can be calculated in each of these directions, and the best taken to be the local search route. This allows generation of a search route with the current location is not considered to be important in determining the search route.

In examples that make use of a probability, the probability can be time-dependent. For example, different probabilities could be set for different time intervals, such as those in table 4. Different locations could use different time intervals, so one car park might have a intervals for "Weekday 8:00-9:00" and "Weekday 9:00-10:00", while another car park might have intervals for "Weekday 7:30-8:30" and "Weekday 8:30-10:30". The route may then be calculated with the probability associated with the current time when the search route is requested, or alternatively, with the probability associated with an estimated time of arrival at the parking space. The probability could also be calculated at an arbitrary time chosen by a user, in order to plan a route for use in the future. The time variation could be implemented by storing a number of probabilities associated with different times for each parking space (or group of parking spaces). Alternatively some mathematical function with a time variable could be used to provide a probability that changes with time. In other examples, the probability at a particular time may be calculated by interpolation or extrapolation of stored probability data. The probability need not be set according to fixed intervals, but rather could be allowed to change over arbitrarily small time intervals, particularly when using a mathematical function or interpolation/extrapolation. The navigation device 200 may obtain the current time from an internal clock, or from an external source, such as via a data connection (e.g. I/O port 270) or input from a user e.g. via input device 220. Allowing the probability to vary with time allows the probability information to more accurately reflect the probability of finding a location of the target type at the potential position.

TABLE 4

| Period | Times | Period | Times |
|---|---|---|---|
| Weekday morning | 00:00-7:00 | Weekday night | 00:00-10:00 |
| Weekday rush am | 7:00-9:30 | Weekend morning | 10:00-12:00 |
| Weekday daytime | 9:30-17:00 | Weekend daytime | 12:00-17:00 |
| Weekday rush pm | 17:00-18:00 | Weekend evening | 17:00-21:00 |
| Weekday evening | 18:00-00:00 | Weekend night | 21:00-00:00 |

The above examples make use of metrics based on distance, e.g. the distance between a parking space and the current location of the navigation device, or the distance between a parking space and a goal. However, the present invention could be implemented using some other metric, such as a metric based on estimated travel time.

A user may be given a choice of cost functions, and the opportunity to vary the parameters (such as α in C3 and C4, above), in order to produce a search route appropriate to the user's current needs. For example, C2 may be the best cost function if the user is close to their destination and wants to park as soon as possible. On the other hand, C4 with a high value of a may be more appropriate if the user is unable to walk long distances and intends to visit a specific goal after parking.

For simplicity of illustration, the examples above do not consider the case where a search route can double back on itself, although the examples could be modified to allow doubling back. Similarly, it was assumed that all roads are two-way and any spaces on the roads can be accessed regardless of direction of travel. Adapted implementations removing these assumptions can be constructed by the skilled man.

For simplicity of illustration, the above examples calculate a route in terms of a direction to be given at the next junction. However, in alternative embodiments, at the time the user requests the route, a full search route is calculated, for example up to some maximum length. The full search route could be constructed by calculating every possible route, up to the maximum search route length, evaluating a cost function for each of these routes, and selecting the best route, based on the cost function, as the full search route. Ideally, the cost function calculated for each of the routes would depend only on roads and car parks visited by that route. An example of a cost function that could be used in such an embodiment is $$C7(Qj) = \sum_{Ri \in Qj} \frac{Pi}{Di},$$

where Qj are calculated routes that include roads Ri. Di is the distance from the current position to an average parking space on road Ri. This example cost function is similar to C2 above, but other cost functions, such as cost functions similar to C1, or C3 to C6 could be used instead. Calculating a full search route is likely to require more processing resources, but is likely to produce an improved search route.

Route planning algorithms known in the art typically employ a cost function based on distance or time to plan a route to a particular goal with a specific position. In some embodiments, one of these known algorithms could be adapted to use a cost function similar to those described above.

According to some embodiments, the navigation device 200 determines a result of the search, that is whether or not a search is successful, and if successful, the location at which the target location was found. In one embodiment, when the target location is a vacant parking space, the user is asked via display device 240 to confirm via the input device 220, when a vacant parking space has been found. The user may also be asked to confirm when a parking space is not found. In another embodiment the search route module 490 determines, based on information from a positioning information determining section 324, that a parking space has been found when the device stops moving, e.g. for a predetermined period of time. Similarly, the search route module 490 may determine that a vacant parking space has not been found if the navigation device 200 continues to move past a potential parking space. In another embodiment the search route module determines that a parking space has been found when the navigation device 200 detects that a vehicle ignition has been switched off. Similarly, it may be determined that a vacant parking space has not been found if the ignition of the vehicle is not switched off and the navigation device 200 has passed the potential parking space.

In some embodiments, for calculating distances to a potential parking space, an average position has been assigned to parking spaces, e.g. the above examples assume that the parking space is at the centre of the road. However, when considering whether a parking space has been passed, it is likely to be more appropriate to consider whether the last possible parking space has been passed, for example, by determining whether the far end of the road has been reached.

In embodiments in which a result of the search is determined, the result can be used in various ways. For example, the information may be used to update probability information in the map information. The result of the search may also be transmitted to a central server 302 via a communications channel 318 such as the Internet to enable the central server 302 to update probability information stored at the server 302, or to distribute the result to other navigation devices 200 to allow use of the result information by the other navigation devices 200. Where the navigation devices 200 are able to communicate with each other directly, the result information may be provided direct to other navigation devices 200, rather than via a central server 302. The navigation device 200 may also use the result to update temporary probability information, as described in more detail below. Similarly, the central server 302 or other navigation device 200 may use received search result information to update temporary probability information. The navigation device 200 may also receive result information from a central server 302 or another navigation device 200, and use this received result information to update probability information and/or temporary probability information. Communication between the navigation device 200 and the central server 302 and/or other navigation device 200 can be via any suitable communication channel 318, such as a connection to the internist via a mobile communication network.

Figure 7:
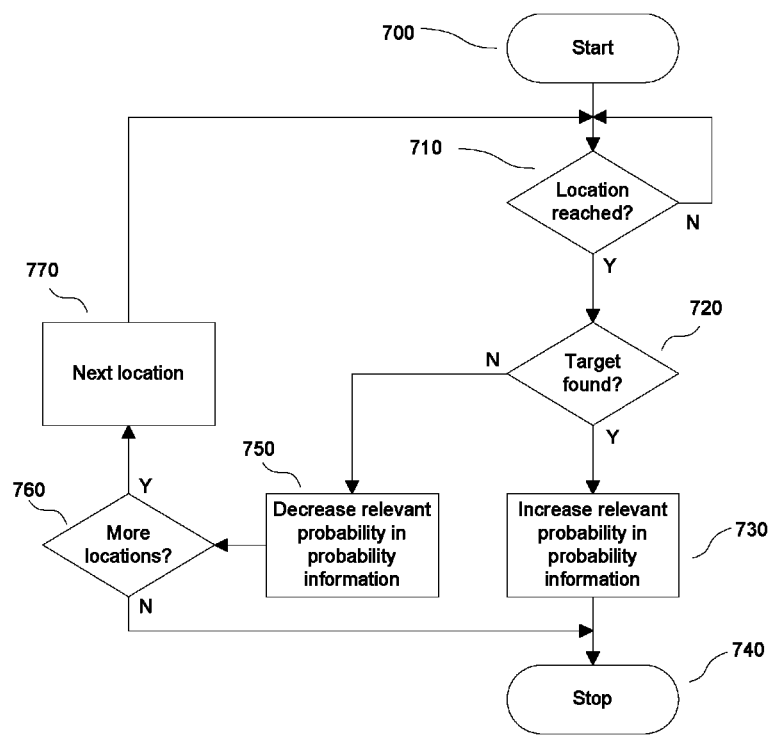
FIG. 7 is a flowchart illustrating a method of adjusting probability information in an embodiment of the invention.

FIG. 7 shows a method of updating the probability information in the navigation device 200 according to one embodiment. The method starts at step 700, and at step 710 a determination is made as to whether a next potential position, such as a parking space, has been reached. When a potential position has been reached, it is determined, at step 720, whether the possible position is of the target location type, e.g. a vacant parking space. If the potential position is of target location type (e.g. a vacant parking space has been found), the method proceeds to step 730, where the probability information is adjusted to increase the probability of finding a location of the target type at the current potential position. Where time dependent probabilities are used, this could involve increasing the probability at all times, or only at or around the current time. After increasing the probability, the method terminates at step 740. If at step 720, it is determined a location of the target type was not found at the potential position (e.g. no vacant parking space found), the method proceeds to step 750, where the probability of finding a target location at the current potential position is decreased. The method then determines at step 760 whether any further potential positions remain in the search route. Where there are further potential positions, the method sets the next potential position as the current potential position (step 770), and then returns to step 710. Where there are no further potential positions, the method terminates at step 740.

Where the probability is based on N previous attempts to find a parking space, of which y were successful, p=y/N. If a space is successfully found, the new probability can be set as p=(y+1)/(N+1), whereas if no space is found, p=y/(N+1). If the values of p are estimates, the initial estimates can be generated by setting values of y and N. For example N might reflect the confidence in the estimate, as a larger N will give a probability that changes more slowly with new data, while y could be set based on N to give a particular estimated initial probability. Over time, the probability should approach a value more representative of the actual probability, as the probability information is refined by finding or not finding a vacant parking space at each potential position and updating the probability accordingly.

Alternatively, the probability information may be stored as a number between 0 and 1. In this case, when a vacant parking space is found the probability can be increased according to $$p_{new} = p_{old} + \frac{1 - p_{old}}{\beta^+},$$

where $p_{new}$ is the adjusted probability, and $p_{old}$ is the probability before the adjustment. $\beta^+$ is a parameter greater than 1 that adjusts how much the probability is changed each time a vacant parking space is found. According to this arrangement, the probability will remain less than 1. When a vacant parking space is not found, the probability can be decreased according to $$p_{new} = p_{old} + \frac{p_{old}}{\beta^-},$$

wherein $\beta^-$ is a parameter greater than 1 that adjusts how much the probability is changed when a vacant parking space is not found. According to this adjustment, the probability will remain above 0. This allows the probability information to become more accurate and adjust automatically to changes in actual probabilities finding a location of the target type.

Figure 8:
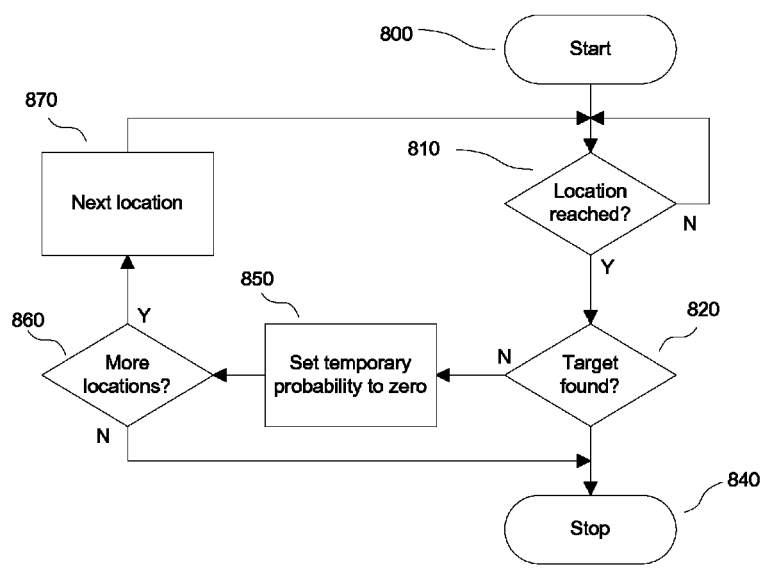
FIG. 8 is a flowchart illustrating a method of adjusting temporary probability information in an embodiment of the invention.

FIG. 8 shows a method of setting a temporary probability in an embodiment of the navigation device 200. According to this embodiment, a temporary probability may be set and, for a short time, the temporary probability is used in place of the basic probability (i.e. the probability described above, e.g. in relation to FIG. 7). Steps 800, 810, 820, 840, 860 and 870 respectively correspond to steps 700, 710, 720, 740, 760 and 770 of FIG. 7. In step 850, after it has been determined in step 820 that a location of the target type has not been found at the current potential position, a temporary probability is set for the current potential position as zero, or to some other low value. When searching for a vacant parking space, for example, this reflects that there currently no space at the current position, and allows this information to be used if the search route is re-calculated in the near future. In time the probability associated with that parking space will revert to the basic probability. This could happen stepwise after a predetermined time or could happen gradually, for example according to $$p(t) = \begin{cases} \left(1 - \frac{t}{T}\right)p(0) + \left(\frac{t}{T}\right)p_{basic}, & 0 < t < T \\ p_{basic}, & t \geq T \end{cases}$$

Here, p(t) represents the probability associated with the potential position at time measured from the determination that there is no vacant parking space. $p_{basic}$ is the basic probability that is used in the absence, of a temporary probability, and T is a parameter that determines the duration of time over which the temporary probability is used. This allows the probability information to be adjusted to take into account information with a short-lived validity.

FIG. 9 shows a method according to an embodiment in which information on the result of the search conducted by a first navigation device 200 is sent to a central server 302, the central server 302 may then use the information to update probability information and/or temporary probability information and provide the updated information to a second navigation device 200. This allows sharing of information between navigation devices, to improve the sample size and accuracy of the information.

Figure 9A:
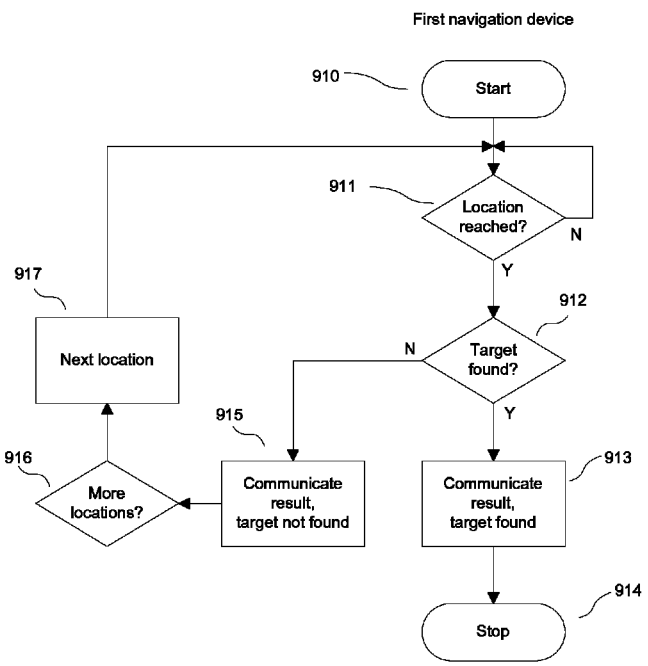
FIG. 9a is a flowchart illustrating a method of communicating result information from a navigation device to a central server in an embodiment of the invention.

FIG. 9a shows the method performed by an embodiment of the first navigation device 200. Steps 910, 911, 912, 914, 916 and 917 are similar to steps 700, 710, 720, 740, 760 and 770 of FIG. 7. After it has been determined in step 912 that a location of the target type has been found at a particular potential position, the first navigation device 200 communicates this information to the central server 320. The method then terminates at step 914. On the other hand, if it is determined, at step 912, that a location of the target type is not found, at the potential position, this information is communicated to the central server 320 at step 915. The method then proceeds to step 916.

Figure 9B:
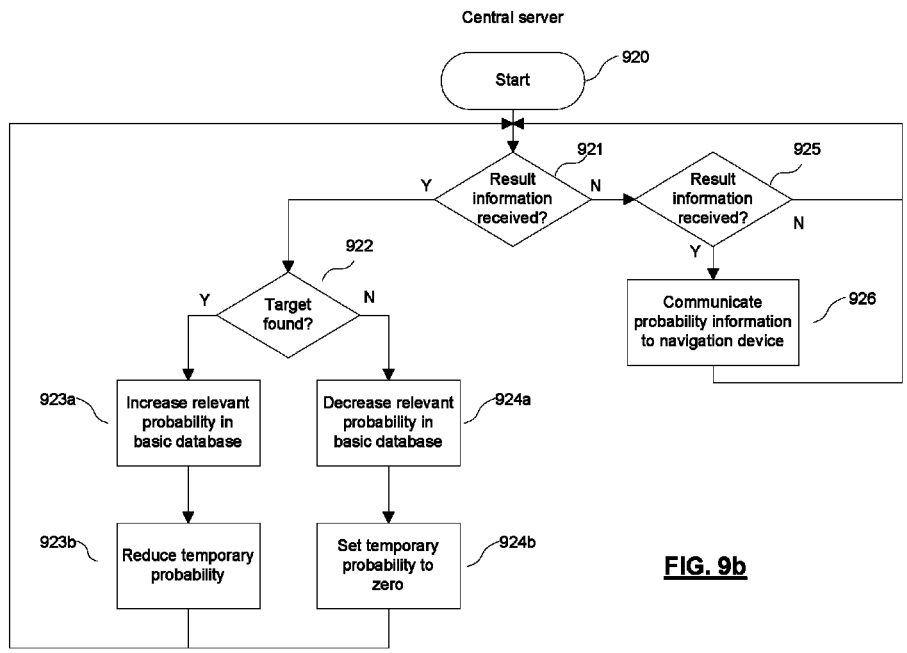
FIG. 9b is a flowchart illustrating a method performed by a central server in an embodiment of the invention.

FIG. 9b shows the method performed by an embodiment of the central server 20. The method starts at step 920, and at step 921 the central server 320 determines whether result information has been received from a navigation device 200, such as the information communicated by the first navigation device 200 in step 914 or 916. When result information has been received, the method proceeds to step 922, where it is determined whether the result information indicates that a target location was found. When a target was found the central server 320 increases, at step 923a, the relevant probability (corresponding to the potential position at which the target location was found) in probability information stored at the central server 320. This improves the probability information by revising the probability information in light of the new information, as described in relation to the navigation device 200, above. As an alternative to, or in addition to, step 923a, a temporary probability stored at the central server 320 may be reduced. In the case of car parking spaces, this reflects the reduction in probability of finding a space at the current moment due to a vehicle associated with the first navigation device 200 parking and using a space. The temporary probability stored at the central server 320 is similar to the temporary probability described in relation to the navigation device 200, above.

If, at step 922, it is determined that a location of the target type was not found, the central server 320 decreases, at step 924a, the relevant probability (corresponding to the potential position at which the target location was found) in probability information stored at the central server 320. This is similar to the adjustment of the probability described in relation to the navigation device 200, above. As an alternative to, or in addition to, step 924a, a temporary probability stored at the central server 320 may be set to zero (or a small number), to reflect the information that the target location type is not currently at the potential location (e.g. there are no vacant parking spaces), and is unlikely to be for at least a small time. The method then returns to step 921.

When, at step 921, no result information is received, the method proceeds to step 925, and it is determined whether a request for information has been received from a navigation device 200. The request could contain request information, which could include one or more of: a type of target location, a current location of the device 200, a desired start location of the search route, a goal X (final destination), an intended journey (departure) time, a vehicle type, or other user preferences for the search route. The skilled man would appreciate that other information may be included in the request information, depending on details of the implementation.

If no request has been received, the method returns to step 921. If a request for information has been received, reply information is provided to the navigation device (step 926), and the method then returns to step 921. The reply information provided to the navigation device can be any information suitable for determining probability information, and could take the form of, for example, paired position and probability data, position data paired with parameters for use in predetermined equations, or parameters for use in predetermined equations where the parameters are not specifically linked to potential positions. Alternatively, the central server 320 could determine the search route and the reply data could be data identifying the search route.

In an alternative arrangement, the navigation device 200 does not send a request for information when a search route is to be planned. Instead, when map data or navigation device software is updated by the central server 320 (e.g. a periodic update), the updated probability and/or temporary probability information is sent from the central server 320 to the navigation device 200. Depending on the lifetime of the temporary information (which would depend on the type of target location) and the frequency of updates, it may be impractical to send temporary information in this manner. In this case, only basic probability information would be sent.

Result information collected by the central server 320 can be used to refine probability information in navigation devices to be produced in the future. Thus, sending result information to the central server 320 can be useful, even in embodiments where the central server 320 does not provide information (such as revised probability information) to the navigation devices 200.

FIG. 9c shows a method performed by an embodiment of the navigation device 200 requesting information from the central server 320. The method starts at step 930, and at step 931, the navigation device receives a request from the user to determine a search route. At step 932 the navigation device 200 sends a request, including request information, to the central server 320, which receives the request at step 925. The navigation device 200 receives, at step 933, the reply information communicated by the central server 320 at step 926. The navigation device 200 determines the search route, based on the reply information (and possibly additional information, such as map information, stored at the navigation device) at step 934. The determination of the search route can be performed according to any of the previous embodiments or examples. If the reply information includes a search route, step 934 may be omitted. The search route is provided to the user at step 935. For example, this could take the form of presenting the complete search route to the user on a map via the display device 240, or providing audio and/or visual directions.

In some embodiments navigation devices 200 may communicate directly with each other, rather than via a central server 320. In this case, for example, result information may be communicated to all navigation devices 200 in a local area (or a subset, such as navigation devices 200 in a predefined group). For embodiments in which result information is automatically shared, it would be unnecessary for devices 200 to send request information. In other embodiments, request information may be sent to all local navigation devices 200, or a subset, and in response to the request, the navigation devices 200 provide reply information. Where the goal X is not local to the current location of the navigation device 200, the "local area" considered above could be the area local to the goal X, rather than the current location.

In embodiments where the navigation device 200 is associated (e.g. mounted in) a vehicle, and a parking space was previously found, the navigation device 200 may determine when the vehicle is leaving or vacating the parking space. This may be based on an input from the user or by detection that the navigation device 200 is moving based on positional information (possibly taking into account that some devices 200 may also be used away from the vehicle, e.g. for navigation by a pedestrian). When the navigation device 200 determines that a parking space has been vacated, this information may be passed to the central server 320 and/or to other navigation devices 200 in the local area, as described above. The central server 320 and/or other navigation devices 200 could then set a temporary probability, along the lines described above, to reflect the presence of the newly vacant parking space, e.g. by setting the temporary probability to 1, or increasing the temporary probability in a predetermined manner (e.g. along the lines describe above for adjusting the basic probability).

In the above embodiments, the device 200 may store all of the map information in a local memory 230, or obtain some or all of the map information from a server 320 via the internet of other communication channel 318.

In another embodiment, the navigation device 200 is a route planning device, such as a desktop computer executing route planning software, that responds to a user request for a search route by operating in a similar manner to the embodiments described above. Other computing devices may be used, as would be clear to the skilled man. The route planning device could also be embodied in a server 320 that receives requests from information terminals (such as desktop computers and mobile phones) connected to the server 320 via a network, such as the Internet, and replies with information describing a search route. Such a server may operate as the central server 320, described above.

In embodiments of the navigation device 200 that are equipped to determine positional information, the user may be provided with directions at, or just before, any point in the journey where a decision must be made regarding a route to be followed. In embodiments that determine positional information, the search route may be recalculated, for example, due to some condition being reached (such as arriving at a junction, when a user deviates from the search route, or when a predetermined time period since the last calculation of the search route has elapsed).

It will be apparent from the foregoing that the teachings of the present invention provide an arrangement whereby a user is provided with a search route that is most efficient, taking into account the likelihood of finding a required type of destination, based on a predetermined measure of efficiency.

It will also be appreciated that whilst various aspects and embodiments of the present invention have heretofore been described the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A route-planning device comprising:
an output device;
one or more processors;
a memory, wherein the memory stores
map information, the map information including information identifying a plurality of potential positions, each potential position corresponding to a position at which a likelihood of a location of a predetermined type is found, the map information further including time dependent probability information for each potential position, the probability information corresponding to the likelihood of finding a location of the predetermined type at the respective potential position at a plurality of different time intervals;
an updating section arranged to receive temporary probability information for at least one potential position of the plurality of potential positions from a server, the temporary probability information to be used in place of the probability information in the map information for a predetermined time before subsequently reverting to the probability information in the map information; and
a search route module,
wherein the one or more processors are arranged to:
determine a search route from a start position at a current or future departure time using the search route module, the search route visiting at least one of the potential positions, the determination of the search route using a predetermined cost function based at least on the probability information for the estimated time of arrival at each potential position to determine a route having a highest probability of potential positions of the predetermined type being found in a shortest time or with a least distance travelled; and provide the determined search route to a user using the output device.

2. The device according to claim 1, wherein the potential positions correspond to parking spaces, the locations of a predetermined type correspond to vacant parking spaces.

3. The device according to claim 1, further comprising an input device for receiving commands from the user, wherein
when the user indicates, via the input device, that a search route for a location of a predetermined type should be determined, the search route module is arranged to set a current position of the device to be the start position of the search route.

4. The device according to claim 3, wherein the cost function is based, at least in part, on a predetermined metric relating the start position and the potential positions.

5. The device according to claim 1, wherein the search route module includes a goal identification section for identifying a goal position, and the cost function is based on a predetermined metric relating the goal position and the potential positions.

6. The device according to claim 1, wherein the search route module further comprises a result determining module arranged to determine whether or not a location of the predetermined type was found at a visited potential position.

7. The device according to claim 6, further comprising a positioning information determination section for determining current positioning information including at least a current position of the device, wherein the result determining module is arranged to:
determine, based on the positioning information, whether a potential position has been reached,
determine whether a vehicle in which the device is provided has parked,
indicate that a location of the predetermined type was found at the potential position if it is determined that the potential position has been reached and it is determined that the vehicle has parked, and
indicate that a location of the predetermined type was not found if it is determined that the potential position has been reached and it is determined that the vehicle has not parked.

8. The device according to claim 7, wherein the device is arranged to determine, after indicating that a location of the predetermined type was found at a particular potential position, whether or not the vehicle has left the particular potential position, and when it is determined that the vehicle has left the particular potential position perform at least one of:
communicate to the server that the particular potential position has been left, and communicate to another route-planning device that the particular potential position has been left.

9. The device according to claim 8,
wherein the updating section is further arranged to perform at least one of:
communicate the determination of the result determining module to the server, and
communicate the determination of the result determining module to the another route-planning device.

10. The device according to claim 1, wherein the cost function is scaled based on user preferred parameters.

11. The device according to claim 1, wherein the subsequent reversion to the probability information in the map information occurs in a stepwise function or gradually.

12. A server comprising:
a receiving section for receiving, over a network, a request for a search route from a remote device;
a sending section for sending, over the network to the remote device, the determined search route;
one or more processors;
a memory, wherein the memory stores
map information, the map information including information identifying a plurality of potential positions, each potential position corresponding to a position at which a likelihood of a location of a predetermined type is found, the map information further including time dependent probability information for each potential position, the probability information corresponding to the likelihood of finding a location of the predetermined type at the respective potential position at a plurality of different time intervals;
an updating section arranged to use received temporary probability information for at least one potential position of the plurality of potential positions in place of the probability information in the map information for a predetermined time before subsequently reverting to the probability information in the map information; and
a search route module,
wherein the one or more processors are arranged to
determine the search route from a start position at a current or future departure time using the search route module, the search route visiting at least one of the potential positions, the determination of the search route using a predetermined cost function based at least on the probability information for the estimated time of arrival at each potential position to determine a route having a highest probability of potential positions of the predetermined type being found in a shortest time or with a least distance travelled.

13. A computer-implemented method of providing a search route comprising:
  receiving a request to provide a search route for a location of a predetermined type;
  accessing, by a processor, stored map information, the map information including information identifying a plurality of potential positions, each potential position corresponding to a position at which a likelihood of a location of a predetermined type is found, the map information further including time dependent probability information for each potential position, the probability information corresponding to a likelihood of finding a location of the predetermined type at the respective potential position at a plurality of different time intervals;
  receiving temporary probability information for at least one potential position of the plurality of potential positions from a server, the temporary probability information to be used in place of the probability information associated with the map information for a predetermined time before reverting to the probability information in the map information;
  determining, by the processor, a route visiting at least one of the potential positions, the determination of the route using a predetermined cost function based at least on the probability information for the estimated time of arrival at each potential position to determine
  a route having a highest probability of potential positions of the predetermined type being found in a shortest time or with a least distance travelled; and
  outputting, by the processor, the determined route as the search route.

14. The method according to claim 13, wherein the subsequent reversion to the probability information in the map information occurs in a stepwise function or gradually.

15. A non-transitory computer readable medium which stores a set of instructions which when executed performs a method for providing a search route, the method executed by the set of instructions comprising:
  receiving a request to provide a search route for a location of a predetermined type;
  accessing, by a processor, stored map information, the map information including information identifying a plurality of potential positions, each potential position corresponding to a position at which a likelihood of a location of a predetermined type is found, the map information further including time dependent probability information for each potential position, the probability information corresponding to a likelihood of finding a location of the predetermined type at the respective potential position at a plurality of different time intervals;
  receiving temporary probability information for at least one potential position of the plurality of potential positions from a server, the temporary probability information to be used in place of the probability information associated with the map information for a predetermined time before reverting to the probability information in the map information;
  determining, by the processor, a route visiting at least one of the potential positions, the determination of the route using a predetermined cost function based at least on the probability information for the estimated time of arrival at each potential position to determine a route having a highest probability of potential positions of the predetermined type being found in a shortest time or with a least distance travelled; and
  outputting, by the processor, the determined route as the search route.

16. The non-transitory computer readable medium according to claim 15, wherein the subsequent reversion to the probability information in the map information occurs in a stepwise function or gradually.

17. The non-transitory computer readable medium according to claim 15, wherein the determination of the search route using the predetermined cost function comprises maximizing or minimizing the cost function.

* * * * *